US009006136B2

(12) United States Patent
Gadkaree et al.

(10) Patent No.: US 9,006,136 B2
(45) Date of Patent: Apr. 14, 2015

(54) HIGHLY POROUS ACTIVATED CARBON WITH CONTROLLED OXYGEN CONTENT

(71) Applicant: Corning Incorporated, Corning, NY (US)

(72) Inventors: Kishor Purushottam Gadkaree, Painted Post, NY (US); Jia Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/973,392

(22) Filed: Aug. 22, 2013

(65) Prior Publication Data
US 2013/0342964 A1    Dec. 26, 2013

Related U.S. Application Data

(62) Division of application No. 12/264,568, filed on Nov. 4, 2008, now Pat. No. 8,541,338.

(51) Int. Cl.
| | | |
|---|---|---|
| *C01B 31/10* | (2006.01) | |
| *B01J 20/20* | (2006.01) | |
| *C01B 31/12* | (2006.01) | |
| *H01G 11/34* | (2013.01) | |

(52) U.S. Cl.
CPC .................. *B01J 20/20* (2013.01); *C01B 31/10* (2013.01); *C01B 31/12* (2013.01); *H01G 11/34* (2013.01)

(58) Field of Classification Search
CPC ........ C01B 31/08; C01B 31/086; B01J 20/04; B01J 20/20; B01J 20/28073
USPC ...................... 502/416, 423–427; 423/445 R
See application file for complete search history.

(56) References Cited

U.S. PATENT DOCUMENTS

| | | | |
|---|---|---|---|
| 4,656,153 A | 4/1987 | Wennerberg | 502/182 |
| 5,776,385 A | 7/1998 | Gadkaree et al. | 264/29.5 |
| 6,156,697 A | 12/2000 | Gadkaree | 502/427 |
| 6,248,691 B1 | 6/2001 | Gadkaree et al. | 502/423 |
| 7,091,156 B2 * | 8/2006 | Hirahara et al. | 502/416 |
| 7,936,566 B2 * | 5/2011 | Shigyo et al. | 361/752 |
| 2003/0217963 A1 * | 11/2003 | Mitchell et al. | 210/435 |

FOREIGN PATENT DOCUMENTS

| | | | |
|---|---|---|---|
| EP | 1211702 A1 | 6/2002 | |
| WO | WO 2004071954 A1 * | 8/2004 | |
| WO | WO 2008071888 A2 * | 6/2008 | |

OTHER PUBLICATIONS

Nakamura, Mitsuhiro, Masanori Nakanishi, and Kohei Yamamoto. "Influence of physical properties of activated carbons on characteristics of electric double-layer capacitors." Journal of power sources 60.2 (1996): 225-231.*
Machien english translation of WO2004071954.*
Lota, G., et al. "Effect of nitrogen in carbon electrode on the supercapacitor performance." Chemical Physics Letters 404.1 (2005): 53-58.*
Illan-Gomez et al., "Activated Carbons From Spanish Coals. 2 Chemical Activation", Energy & Fuels, 1996, 10, 1108-1114.
Treusch et al , "Basic Properties of Specific Wood-based Materials Carbonised In A Nitrogen Atmosphere", Wood Sci Technol, 2004, 38, 323-333.
Cadek et al., "Big-Based Materials for Supercapacitor", Carbon 2007 Program and Short Abstracts, The American Carbon Society—International Conference on Carbon, 2007.
Pandolfo et al., "Carbon Properties and Their Role in Supercapacitors", Journal of Power Sources 157, 2006, 11-27.
Ahmadpour et ul., "The Preparation of Activated Carbon From Macadamia Nutshell by Chemical Activation", Carbon, 1997, vol. 35, No. 12, 1723-1712.
Tennison, "Phenolic Resin Derived Activated Carbons", Applied Catalysis A: General, 1998, 173, 289-311.
Ania, et al., "effects of activated carbon properies on the adsorption of napthalene from aqueous solutions," Applied Surface Science 253 (2007) 5741-5746.
Nakamura, et al "Influence of physical properties of activated carbons on characteristics of electric double-layer capacitors." Journal of Power Sources 60 (1956) 225-231.
Teng et al., "Preparation of Porous Carbons From Phenol-Formaldehyde Resins With Chemical and Physical Activation", Carbon 38, 2000, 817 824.
Yue et al., "Preparation of Fibrous Porous Materials by Chemical Activation 2. H3PO4 Activation of Polymer Coated Fibers", Carbon 41, 2003, 1809-1817.
Ahmadpour et al , "The Preparation of Active Carbons From Coal by Chemical and Physical Activation", Carbon, 1996, vol. 34, No. 4, 471-479.
Yue et al., "Prepararon of Fibrous Porous Materials by Chemical Activation, ZnCl2 Activation of Polymer-Coated Fibers", Carbon 40, 2002, 1181-1191.
Kadlec et al., "Structure of Pores of Active Carbons Prepared by Water-Vapour and Zinc-Dichloride Activation", Carbon, 1970, vol. 8, 321-331.
Qiao, et al., "Waste polyvinylchloride derived pitch as a precursor to develop carbon fibers and activated carbon fibers," Waste Management 27 (2007) 1884-1890.

* cited by examiner

*Primary Examiner* — Richard M Rump
(74) *Attorney, Agent, or Firm* — Michael Russell

(57) ABSTRACT

Nanoporous activated carbon material having a high specific capacitance in EDLCs and controlled oxygen content, and methods for making such activated carbon material. Reduction of oxygen content is achieved by (a) curing a carbon precursor/additive mixture in an inert or reducing environment, and/or (b) refining (heating) activated carbon material after synthesis in an inert or reducing environment. The inert or reducing environment used for curing or refining is preferably substantially free of oxygen.

4 Claims, No Drawings

HIGHLY POROUS ACTIVATED CARBON WITH CONTROLLED OXYGEN CONTENT

CROSS-REFERENCE TO RELATED APPLICATIONS

This is a divisional of U.S. patent application Ser. No. 12/264,568 filed on Nov. 4, 2008, the content of which is relied upon and incorporated herein by reference in its entirety, and the benefit of priority under 35 U.S.C. §120 is hereby claimed.

BACKGROUND

The present invention relates to porous activated carbon materials having controlled oxygen content and more specifically to highly porous activated carbon materials and methods for forming highly porous activated carbon materials having an oxygen content that is lower than that for carbon materials produced by conventional processes. The invention also relates to high power density energy storage devices comprising controlled oxygen content carbon-based electrodes.

Energy storage devices such as electric—also called electrochemical—double layer capacitors (EDLCs), a.k.a. supercapacitors or ultracapacitors may be used in many applications where a discrete power pulse is required. Such applications range from cell phones to electric/hybrid vehicles. An important characteristic of an ultracapacitor is the energy density that it can provide. The energy density of the device, which comprises one or more carbon electrode(s) separated by a porous separator and/or an organic or inorganic electrolyte, is largely determined by the properties of the carbon electrodes and, thus, by the properties of the carbon material used to form the electrodes.

Indeed, the performance of an energy storage device comprising carbon-based electrodes is largely determined by the physical and chemical properties of the carbon. Physical properties include surface area, pore size and pore size distribution, and pore structure, which includes such features as pore shape and interconnectivity. Chemical properties refer particularly to surface chemistry, which relates to the type and degree of surface functionalization.

Carbon electrodes suitable for incorporation into EDLCs are known. High performance carbon materials, which form the basis of such electrodes, can be made from natural and/or synthetic carbon precursors. For example, activated carbon can be made by heating a synthetic carbon precursor in an inert environment to a temperature sufficient to carbonize the precursor. During or following the process of carbonization, the carbon material can be activated. Activation can comprise physical activation or chemical activation.

Physical activation is performed by exposing the carbon material to steam or carbon dioxide ($CO_2$) at elevated temperatures, typically about 800-1000° C. Activation can also be carried out by using an activating agent other than steam or $CO_2$. Chemical activating agents such as phosphoric acid ($H_3PO_4$) or zinc chloride ($ZnCl_2$) can be combined with the carbon material and then heated to a temperature ranging from about 500-900° C.

As an alternative to performing chemical activation post-carbonization, one or more chemical activating agents can be combined with a carbon precursor in a curing step prior to carbonization. In this context, curing typically comprises mixing a carbon precursor with a solution of an activating agent and then heating the mixture in air. In addition to phosphoric acid and zinc chloride, chemical activating agents may also include KOH, $K_2CO_3$, KCl, NaOH, $Na_2CO_3$, NaCl, $AlCl_3$, $MgCl_2$ and/or $P_2O_5$, etc.

In embodiments where a chemical activating agent is used, it is preferred to homogeneously distribute the chemical activating agent throughout the carbon precursor at a molecular level prior to curing the carbon precursor. This molecular level mixing prior to curing enables a homogeneous distribution of porosity after activating.

The activated carbon product can be washed in an acid or base solution and then with water to remove both the activating agent and any chemical species derived from reactions involving the activating agent. The activated carbon can then be dried and optionally ground to produce material comprising a homogeneous distribution of nanoscale pores. Activated carbon produced by this method offers significantly higher energy storage capacity in EDLCs compared to major commercial carbons.

Whether the carbon material is activated using physical or chemical activation, the incorporation of oxygen into the carbon, especially in the form of oxygen-containing surface functionalities, can adversely affect the properties of energy storage devices that comprise electrodes made from the activated carbon. For example, the presence of oxygen-containing surface functionalities can give rise to pseudocapacitance, increase the self-discharge or leakage rate, cause decomposition of the electrolyte, and/or cause a long term increase in resistance and deterioration of capacitance.

Oxygen functionalities can be introduced both during the curing step, where the mixture of carbon precursor and activating agent is oxidized at intermediate temperatures, and during the carbonization and activation steps, where the activating agent (e.g., steam or KOH) serves as an oxidation agent.

As a result of the potentially deleterious effects of incorporated oxygen, it can be advantageous to control and preferably minimize the oxygen content in activated carbon for use in energy storage devices such as EDLCs. Accordingly, it would be an advantage to provide a highly porous activated carbon material having a controlled oxygen content that can be used to form carbon-based electrodes that enable high energy density devices.

SUMMARY

These and other aspects and advantages of the invention can be accomplished according to one embodiment wherein, after synthesis of an activated carbon material, a post-synthesis refining step comprises heating the activated carbon material in an inert or reducing environment at an elevated temperature. The inert or reducing environment is preferably substantially free of oxygen. According to a further embodiment, highly porous activated carbon having controlled oxygen content can be prepared by using a modified curing step. In the modified curing step, prior to the steps of carbonization and activation, a carbon precursor/chemical activating agent mixture is heated to an intermediate temperature in an environment that is substantially free of oxygen. The substantially oxygen-free environment can comprise one or more inert or reducing gases. A still further embodiment combines both approaches.

The activated carbon materials produced according to the present invention can be characterized by nanoporosity, high specific capacitance when incorporated into EDLCs, and controlled oxygen content. In one embodiment, the inventive activated carbon has a total oxygen content of less than 10 wt. %.

Additional features and advantages of the invention will be set forth in the detailed description which follows, and in part will be readily apparent to those skilled in the art from that description or recognized by practicing the invention as described herein, including the detailed description which follows, as well as the appended claims.

It is to be understood that both the foregoing general description and the following detailed description present embodiments of the invention, and are intended to provide an overview or framework for understanding the nature and character of the invention as it is claimed.

DETAILED DESCRIPTION

The invention relates generally to highly porous activated carbon materials and methods for producing such carbon materials. Such materials are especially suited for incorporation into EDLCs. The activated carbon materials are, in some embodiments, characterized by nanoporosity, high specific capacitance in EDLCs, and a total oxygen content that is limited to at most 10 wt. %. By total oxygen content is meant the sum of all atomic and molecular oxygen in the carbon, including oxygen in oxygen-containing functional groups in and/or on the carbon.

High nanoporosity and high specific capacitance are valuable for making high performance EDLCs devices, and controlled oxygen content is valuable for improving the long term stability of the devices, reducing pseudo capacitance, reducing leakage, and reducing electrolyte decomposition. A lower oxygen content also reduces the tendency for the nanoporous carbon material to adsorb water from surrounding environment and makes it easier to remove water from the carbon material by heat treatment or other means. This is advantageous for manufacturing carbon electrodes for EDLCs since the amount of water in such electrodes should be minimal.

In one embodiment, activated carbon material is subjected to a refining step wherein the activated carbon is heated in an inert or reducing environment to a temperature ranging from, for example, about 450-1000° C., and for a period of, for example, about 0.5-10 hours. Preferably, the environment during the refining step is substantially free of oxygen. The refining step advantageously reduces the oxygen content in the activated carbon. As used herein, when referring to a range of values, the modifier "about" refers to both values in the range. Thus, by way of a clarifying example, disclosure of a temperature in the range of about 450-1000° C. means a temperature in the range of about 450° C. to about 1000° C.

In a further embodiment, a mixture of a carbon precursor and a chemical activating agent is heated in a substantially oxygen-free environment so as to cure the carbon precursor. This modified curing step advantageously reduces the oxygen content in the resulting activated carbon, which is achieved by carbonization and activation of the cured carbon precursor.

In a still further embodiment, a method of forming a porous activated carbon material having controlled oxygen content comprises forming a mixture of a carbon precursor and an inorganic compound, heating the mixture at a first temperature to cure the carbon precursor, and heating the cured carbon precursor at a second temperature higher than the first temperature to carbonize the carbon precursor and produce an activated carbon material, such that the method further comprises at least one of (a) heating the mixture at the first temperature in an environment that is substantially free of oxygen, and (b) heating the activated carbon material at a third temperature in an environment that is substantially free of oxygen to refine the activated carbon material.

By curing is meant a heating step that at least partially cross-links or polymerizes a carbon precursor to form a solid material. The cured carbon precursor can then be carbonized and activated. During the carbonizing step, the carbon precursor is reduced or otherwise converted to elemental carbon. During the activation step, which may be conducted concurrently with the carbonization step, the elemental carbon material is processed to increase its porosity and/or internal surface area.

In some embodiments, the activated carbon material produced according to the present invention comprises a total oxygen content of less than 10 wt. %. In additional embodiments, the total oxygen content is less than 9, 8, 7, 6, 5, 4, 3, 2 or 1 wt. %. The following examples will further clarify the invention.

EXAMPLES

According to one method for making highly porous activated carbon, an aqueous solution of KOH (45 wt. %) and an aqueous phenolic resin (Georgia Pacific GP® 510D34) are mixed in a ratio of 3:1 by weight. The mixture is cured by heating in an oven at 125° C. for 24 hours and then at 175° C. for 24 hours to obtain a sponge-like solid with a dull to brown-yellow color. The atmosphere in the oven is ambient air.

Following curing, the cured resin is broken into small pieces by mechanical force. A known amount (e.g., 250 grams) is placed in a graphite crucible and loaded in a retort furnace (CM Furnaces, Model 1216FL) for carbonization/activation. The furnace temperature is increased at a rate of 200° C./hr to 800° C., held constant at 800° C. for 2 hours, and then cooled down naturally. Throughout the heating cycle, the furnace is purged with $N_2$.

Once the furnace temperature has dropped to ambient temperature, the $N_2$ purge is saturated with water vapor by bubbling the $N_2$ through hot deionized (DI) water. This step of introducing water-saturated $N_2$ to the furnace interior allows any metallic potassium that has been produced during the heating cycle to react with water vapor and form KOH. Without this step, metallic potassium could self-ignite and possibly explode when exposed to oxygen.

The $N_2$/water vapor purge is continued for 3 hours before the furnace is opened and unloaded. The resulting activated carbon material is soaked in 1 liter of DI water for a few minutes and filtered. It is then soaked in 500 ml of 37% HCl solution for an hour and filtered again. Finally, it is washed repeatedly with DI water until the pH of the effluent is the same as that of the DI water. These washing steps effectively remove KOH and other derived potassium compounds from the activated carbon. Finally, the activated carbon is dried overnight at 110° C. in a vacuum oven and ground to the desired particle size (typically several micrometers).

One typical carbon sample made by the above method was measured using nitrogen adsorption on a Micromeritics ASAP 2420. The BET surface area was 1894 $m^2/g$ and the total and micro pore volumes were 0.78 $cm^3/g$ and 0.67 $cm^3/g$, respectively. Carbon made as such typically contains about 10 wt. % oxygen by elemental analysis. As mentioned previously, oxygen can be introduced during one or both of the curing and carbonization/activation steps.

One method to reduce oxygen content is to refine (heat) the activated carbon material in an inert environment (such as nitrogen, helium, argon, etc) or in a reducing environment (such as hydrogen, forming gas, carbon monoxide, etc.). A batch of activated carbon material, which will be referred to hereafter as "standard activated carbon," was obtained by the process described above. In a series of experiments, the standard activated carbon material was divided into several samples that were heat-treated in a controlled environment at different temperatures.

These refining experiments were conducted in a retort furnace (CM Furnaces, Model 1212FL) purged with nitrogen. To conduct the refining, the furnace temperature was increased at a rate of 200° C./hr. to the desired refining heat treatment temperature, held constant for 2 hours, and then cooled down to room temperature before exposure to ambient atmosphere.

The standard activated carbon (sample #1) and refined activated carbon material that was heated to 500° C. or 800° C. (samples #2 and #3, respectively) were analyzed for elemental composition and for EDLC performance in button cells. In these tests, a 1.5M solution of tetraethylammonium tetrafluoroborate in acetonitrile was used as the electrolyte and the button cells were charged to 2.7V. These analytical results are summarized Table 1. In the header of Table 1, the abbreviation "SC" stands for specific capacitance.

It can be seen that the oxygen content was reduced by the refining treatment and the magnitude of oxygen reduction was increased by increasing the refining temperature. The specific capacitance for samples 2 and 3 was essentially the same as for the standard activated carbon on both a gravimetric and volumetric basis. One typical carbon sample refined by heat treatment in $N_2$ at 800° C. for 2 hours was measured using nitrogen adsorption on a Micromeritics ASAP 2420. The BET surface area was 1826 $m^2/g$ and the total and micro pore volumes were 0.75 $cm^3/g$ and 0.65 $cm^3/g$, respectively.

TABLE 1

Analytical results for different carbon materials

| Sample | Process Description | Oxygen Content [wt. %] | Gravimetric SC [F/g] | Volumetric SC [F/cc] |
| --- | --- | --- | --- | --- |
| 1 | Standard activated carbon (air cure, standard carbonization/activation, no refining heat treatment) (comparative) | 9.5 | 171 | 104 |
| 2 | Refined activated carbon after refining heat treatment in $N_2$ at 500° C. for 2 hours | 7.0 | 170 | 102 |
| 3 | Refined activated carbon after refining heat treatment in $N_2$ at 800° C. for 2 hours | 3.9 | 163 | 100 |
| 4 | Nitrogen ($N_2$) cure, standard carbonization/ activation, no refining heat treatment | 8.0 | 199 | 99 |

A further method to control the oxygen content in carbon is to cure the phenolic resin/activating agent mixture in an oxygen-free environment instead of air. In one experiment, an aqueous solution of KOH (45 wt. %) and an aqueous phenolic resin (Georgia Pacific GP® 510D34) are mixed in a ratio of 3:1 by weight. The resin/activating agent mixture is then cured by heating in a retort furnace (CM Furnaces, Model 1212FL) at 125° C. for 24 hours and then at 175° C. for 24 hours during which time the furnace is purged with nitrogen gas.

The cured resin, which comprises a sponge-like solid having a bright-yellow color, is carbonized and activated using the process described above. In comparison to the standard carbon (sample #1), this carbon material (sample #4) shows a substantially lower oxygen content, higher gravimetric specific capacitance, and a comparable volumetric specific capacitance.

The methods for controlling oxygen content in activated carbon disclosed above may be practiced over a range of possible variations, including a variety of different materials and processes. The carbon precursor, for example, can comprise one or more of a natural or synthetic precursor. Examples of suitable natural precursors include coals, nut shells, woods, and biomass. Examples of suitable synthetic precursors include polymers such as phenolic resin, poly (vinyl alcohol) (PVA), polyacrylonitrile (PAN), etc.

A variety of different activating agents can be used. In addition to steam and $CO_2$, suitable chemical activating agents can comprise one or more inorganic compounds such as KOH, $K_2CO_3$, NaOH, $Na_2CO_3$, $P_2O_5$, $AlCl_3$, $MgCl_2$, $ZnCl_2$ and $H_3PO_4$. Chemical activating agents can be combined with a carbon precursor in the form of an aqueous solution or, alternatively, in solid form.

During a step of curing with a chemical activating agent, the carbon precursor and the chemical activating agent can be in the physical form of solid, solid powder, or solution before they are combined. If a solution is used, it is preferably an aqueous solution and the concentration can range from about 10-90 wt. %. The carbon precursor and chemical activating agent can be combined in any suitable ratio. A ratio of carbon precursor to chemical activating agent on the basis of dry material weight can range from about 1:10 to 10:1. For example, the ratio can be about 1:1, 1:2, 1:3, 1:4, 1:5, 5:1, 4:1, 3:1, 2:1 or 1:1.

The curing step comprises heating a carbon precursor/ activating agent mixture to a temperature in the range of about 100-300° C. for a period of about 1-48 hours. During the heat-up, hold, and cool-down cycles, the mixture is preferably maintained in a reducing or inert environment. One or more reducing gases (e.g., $H_2$, $H_2/N_2$ mixtures, CO) and/or one or more inert gases (e.g., $N_2$, He, Ar) can be used. Further, the environment during the curing step is preferably substantially free of oxygen. As defined herein, substantially free of oxygen means that the gas phase oxygen ($O_2$) content is less than 10 ppm, preferably less than 5 ppm, more preferably less than 2 or 1 ppm.

The carbonization and activation steps comprise heating cured or uncured carbon precursor material to a temperature in the range of about 650-900° C. for a period of about 0.5-10 hours. As noted above, carbonization and activation can be performed during the same heating cycle. Alternatively, separate heating cycles can be used to control carbonization and activation separately. The heating and cooling rates for the carbonization and/or activation steps can range from about 10-600° C./hr. As with the curing step, during carbonization and activation, the environment is controlled to be an inert or reducing environment. A preferred environment during both carbonization and activation is substantially free of oxygen.

The refining step may comprise heating activated carbon to a temperature in the range of about 450-1000° C. for a period of about 0.5-10 hours. As with the carbonization and activation steps, the heating and cooling rates for the refining step can vary from about 10-600° C./hr, and the environment during refining is preferably controlled to be an inert or reducing environment, more preferably an environment that is substantially free of oxygen. Thus, the refining step may be conducted at a temperature that is the same as the temperature used in the carbonization and activation steps, or the refining step may be conducted at a temperature that is greater than or less than the carbonization/activation temperature.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A porous activated carbon material formed according to a method, comprising:
    forming a mixture of a carbon precursor selected from the group consisting of a synthetic polymer thermosetting resin and a synthetic polymer thermoplastic resin and an inorganic compound selected from the group consisting of KOH, $K_2CO_3$, KCl, NaOH, $Na_2CO_3$, NaCl, $P_2O_5$, $AlCl_3$, $MgCl_2$, $ZnCl_2$ and $H_3PO_4$;
    heating the mixture at a first temperature to cure the carbon precursor;
    heating the cured carbon precursor at a second temperature higher than the first temperature to carbonize the carbon precursor and produce an activated carbon material, wherein the method further comprises:
    (a) heating the mixture at the first temperature in a nitrogen environment, and
    (b) washing the activated carbon to remove the inorganic compound and then heating the washed activated carbon material at a third temperature ranging from about 450° C. to 1000° C. in an environment that is substantially free of oxygen to refine the activated carbon material, wherein the activated carbon material comprises 7 to 8 wt. % oxygen and at least one of a microporous volume of 0.65 to 0.67 $cm^3$/g and a total pore volume of 0.75 to 0.78 $cm^3$/g.

2. The porous activated carbon material according to claim 1, consisting essentially of nanoscale porosity.

3. A high power density energy storage device comprising at least one carbon electrode, wherein the at least one carbon electrode comprises the porous activated carbon material according to claim 1.

4. The high power density energy storage device according to claim 3 comprising a pair of carbon electrodes, wherein both carbon electrodes comprise the porous activated carbon material according to claim 1.

* * * * *